US006556661B1

(12) United States Patent
Ingalsbe et al.

(10) Patent No.: US 6,556,661 B1
(45) Date of Patent: Apr. 29, 2003

(54) IN-LINE TELEPHONY DATA PROTECTOR WITH LINE CONDITION ANNOUNCE

(75) Inventors: Daryl E. Ingalsbe, Blair, NE (US); Douglas H. Ferguson, Eden Valley, MN (US)

(73) Assignee: Independent Technologies, Inc., Omaha, NE (US)

( * ) Notice: Subject to any disclaimer, the term of this patent is extended or adjusted under 35 U.S.C. 154(b) by 47 days.

(21) Appl. No.: 09/713,978

(22) Filed: Nov. 16, 2000

Related U.S. Application Data
(60) Provisional application No. 60/165,676, filed on Nov. 16, 1999.

(51) Int. Cl.[7] .......................... H04M 1/24; H04M 3/08; H04M 3/22
(52) U.S. Cl. .................. 379/22.04; 379/21; 379/22.01; 379/22.06; 379/27.01; 379/27.06; 379/27.07
(58) Field of Search ........................ 379/1.01, 21, 22, 379/22.01, 22.06, 22.07, 23, 26.01, 27.01, 27.03, 27.05, 27.06, 27.07, 28, 29.01, 29.03, 29.04, 31

(56) References Cited

U.S. PATENT DOCUMENTS

| | | | | |
|---|---|---|---|---|
| 4,864,226 A | * | 9/1989 | Tachimoto et al. | 324/157 |
| 5,577,115 A | * | 11/1996 | Deutsch et al. | 379/399.01 |
| 6,181,775 B1 | * | 1/2001 | Bella | 379/29.01 |
| 6,188,750 B1 | * | 2/2001 | Kiko | 379/38 |
| 6,215,855 B1 | * | 4/2001 | Schneider | 379/22 |
| 6,272,209 B1 | * | 8/2001 | Bridger et al. | 379/27.01 |
| 6,330,306 B1 | * | 12/2001 | Brown | 379/21 |
| 6,351,533 B1 | * | 2/2002 | Parrott | 379/412 |
| 6,373,923 B1 | * | 4/2002 | Williamson et al. | 379/22.01 |

* cited by examiner

Primary Examiner—Binh Tieu
Assistant Examiner—Quoc Tran
(74) Attorney, Agent, or Firm—Skinner and Associates

(57) ABSTRACT

A data protector for telephony test equipment, comprising a relay for selectively connecting the telephony test equipment to a telecommunication line, and electronic circuitry. The electronic circuitry includes a detector portion adapted for detecting signals within a continuous band of frequencies present on the telecommunication line, and a microcontroller. The microcontroller has a frequency counter function for determining whether data is present on the telecommunication line, a relay connect control function for selectively controlling the relay to connect the telephony test equipment to the telecommunication line, and an alert operator function for producing a signal if the detected frequency is above a predetermined threshold. A method for preventing telephony test equipment from unintentionally disrupting signals on telecommunication lines, comprising the steps of: providing a relay between the telecommunication test equipment and the telecommunication line; providing electronic circuitry including a single band frequency counter; determining whether data signals are present on the telecommunication line using the single band frequency counter; in response to determining that data signals are not present on the line, closing the relay to connect the telecommunication test equipment to the telecommunication line; and in response to determining that data signals are present on the line, providing an indication to the technician that data is present and preventing connection between the telecommunication test equipment and the telecommunication line.

19 Claims, 9 Drawing Sheets

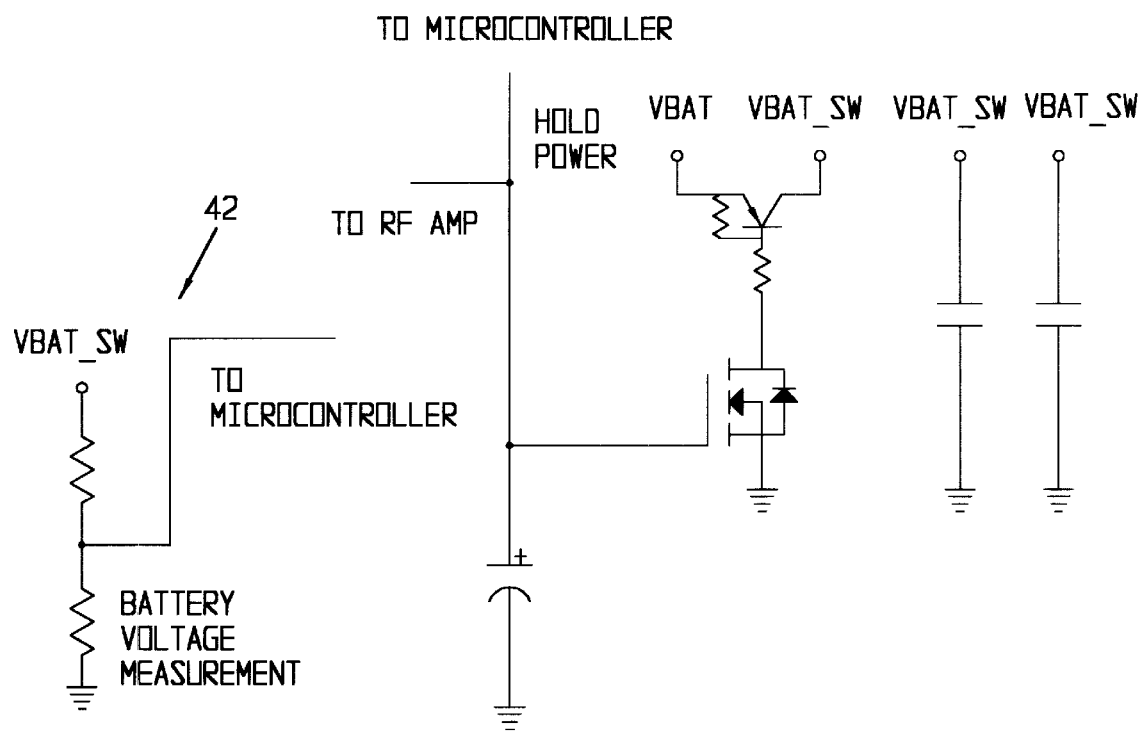
FIG. 6
FIG. 7
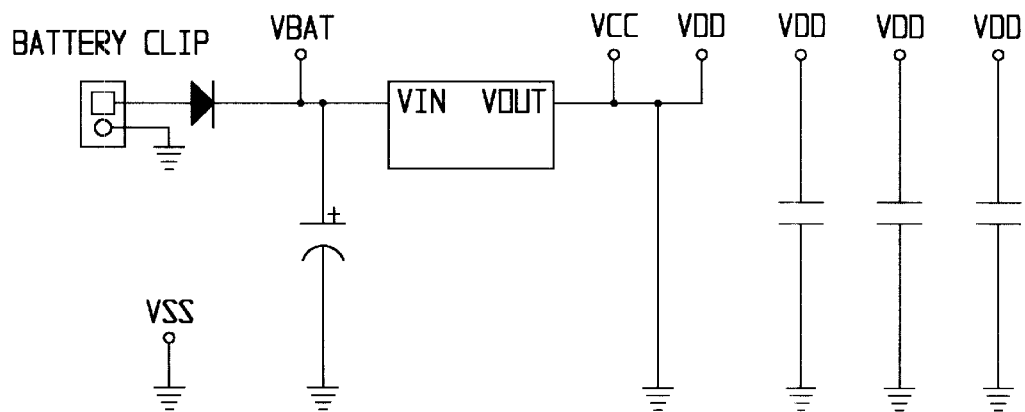
FIG. 8

IN-LINE TELEPHONY DATA PROTECTOR WITH LINE CONDITION ANNOUNCE

CROSS-REFERENCE TO RELATED APPLICATIONS, IF ANY

This application claims the benefit under 35 U.S.C. §119 (e) of provisional application Ser. No. 60/165,676, filed Nov. 16, 1999, which is hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention.

The present invention relates, generally, to testing apparatus and methods within the telephony industry. More particularly, the invention relates to telephone test set equipment, and has particular utility as an apparatus and method for preventing the unintentional disruption of high-speed data traffic on telecommunication lines, for integrating field service test equipment into one test set, and for providing audible line condition announcements.

2. Background Information.

The state of the art in general includes various apparatus and methods for monitoring telecommunication lines to detect communication signals. One such apparatus is a conventional test set which has a high impedance monitor mode that allows eavesdropping on telecommunication lines and an Off-Hook mode that may disrupt an existing signal on the line. If the spectrum of the signal falls into the voice band of communication (300 Hz to 3.3 kHz), the technician will hear the signal on the line when the test set is in the monitor mode and will know that the mode of the test set should not be changed from monitor to Off-Hook. However, many data lines, including T1, Eb 1, DSL and ISDN lines, have spectral energy that falls outside of the voice band of communication and thus is beyond the normal frequency range of hearing for humans. Since the ultrasonic information on these data lines cannot be heard, there is a substantial risk that an operator may incorrectly conclude that a signal is not present and place the test set from monitor to Off-Hook. When the test set is placed in the Off-Hook mode, the AC and DC impedance of the test set drops to levels which will adversely effect the data integrity of most data lines.

The state of the art includes various devices and methods for detecting data traffic on a phone line. The known art includes frequency meters that monitor the line for the presence of signals. These frequency meters may include analog discriminators for prescribed frequency bands, and LEDs that provide a visual indication of the frequency bands present in any detected signal. The state of the art also includes various volt and current meters.

This technology is believed to have significant limitations and shortcomings. One problem is that this technology is not adapted for handling DSL loops; i.e. loops that have both a POTS (Plain Old Telephone Service) signal in the voice band frequency range of 300 Hz to 3 kHz, and an ultrasonic ADSL (Asymmetric Digital Subscriber Line) signal in the frequency range of 12 kHz to 1.1 MHz. In this situation, even though ADSL signals are detected, it is still desirable to bring the test set off hook to draw a dial tone in the voice band. However, doing so with the known technology is detrimental to the ADSL signals. Another problem with the known technology is that it requires a non-trivial amount of training for a technician to properly identify the status of the line being tested.

This invention provides an apparatus and method for preventing the unintentional disruption of high speed data traffic on telecommunication lines including DSL lines, for integrating field service test equipment into one user-friendly test set, and for providing audible line condition announcements which is believed to constitute an improvement over existing technology.

BRIEF SUMMARY OF THE INVENTION

The present invention provides a data protector for telephony test equipment that generally comprises a relay for selectively connecting the telephony test equipment to a telecommunication line, and electronic circuitry. The electronic circuitry includes a detector portion adapted for detecting signals within a continuous band of frequencies present on the telecommunication line, and a microcontroller. The microcontroller has a frequency counter function for determining whether data is present on the telecommunication line, a relay connect control function for selectively controlling the relay to connect the telephony test equipment to the telecommunication line, and an alert operator function for producing a signal if the detected frequency is above a predetermined threshold.

The data protector is preferably a ADSL-compatible data protector with line condition announce, wherein a ADSL filter is connected between the telephony test equipment and the telecommunication line. The ADSL filter is adapted for preventing the telephony test equipment from detrimentally affecting DSL frequencies while enabling POTS frequencies to pass through to the telephony test equipment. The electronic circuitry for an ADSL-compatible data protector further includes a ADSL compatible voltage protection portion electrically connected between the telecommunication line and the detector portion. The ADSL compatible voltage protection portion is adapted for protecting against large voltage spikes and further is adapted for minimizing signal distortion that may introduce harmonic frequencies that may interfere with signals in higher frequency bands.

The data protector with voice announce further includes a voice production portion operably connected to the microcontroller. The alert operator function produces an alert signal received by the voice production portion. In response to receiving the alert signal, the voice production portion produces a corresponding voice announcement signal to a receiver in the telephony test equipment.

The present invention further provides a method for preventing telephony test equipment from unintentionally disrupting signals on telecommunication lines that generally comprises the steps of: providing a relay between the telecommunication test equipment and the telecommunication line; providing electronic circuitry including a single band frequency counter; determining whether data signals are present on the telecommunication line using the single band frequency counter; in response to determining that data signals are not present on the line, closing the relay to connect the telecommunication test equipment to the telecommunication line; and in response to determining that data signals are present on the line, providing an indication to the technician that data is present and preventing connection between the telecommunication test equipment and the telecommunication line.

The data protector of the present invention either may be incorporated into or used as an add-on in conjunction with telephony test equipment, such as a test set for example, to avoid disruption of high speed data traffic on telecommunication lines. The data protector maintains a disconnect between the test set and the line until it can be verified that telecommunication signals are not present on the line. The data protector has two modes of operation. In the first mode, DC voltage is detected causing the device to power up automatically and to automatically check for the presence of data, i.e. a signal with a frequency outside the normal voice band. If no data is found, a connection to the line is made automatically allowing the operator to place the test set Off-Hook. If data is found, a connection to the line will not be made unless the operator consciously chooses to override the lockout or disconnect. This may be desirable to draw a dial tone in the voice band of a DSL loop, for example. In the second mode, DC voltage is not detected. A user actuates a test button (TEST switch S1) to power up the device and check for the presence of data. If no data is found, a connection to the line is made allowing an operator to place the test set Off-Hook.

The data protector utilizes a wide band RF amplifier and is controlled by a microprocessor/microcontroller. Together, the wide band RF amplifier and the microcontroller form a single or continuous band digital frequency detector. The microcontroller counts the signal cycles to detect the frequency. An audio output signal, i.e. the voice announce signal, is transmitted to the test set upon detection of any data signals outside of the normal voice band. The voice announce signal indicates to the operator of the test set that data is present and that a connection to the line will not be made if the operator attempts to place the test set Off-Hook. The voice announce signal is produced by a voice production portion of the circuitry, which includes a voice generator and an audio amplifier, and which is controlled by the microcontroller. Therefore, the data protector has a line status announce feature (i.e. an English voice signal) that actually tells the technician whether data is present, and because of the inclusion of the voltage and current sensor portions, the line voltage and loop current of the line under test. This voice announcement signal is heard in the receiver of the test set.

The features, benefits and objects of this invention will become clear to those skilled in the art by reference to the following description, claims and drawings.

BRIEF DESCRIPTION OF THE SEVERAL VIEWS OF THE DRAWING

FIG. 6 is a schematic diagram for the Battery Voltage Measurement Portion of the electronic circuitry of FIG. 2.

FIG. 7 is a schematic diagram for the Enable Power Portion of the electronic circuitry of FIG. 2.

FIG. 8 is a schematic diagram for the Voltage Regulator Portion of the electronic circuitry of FIG. 2.

DETAILED DESCRIPTION

Figure 1:
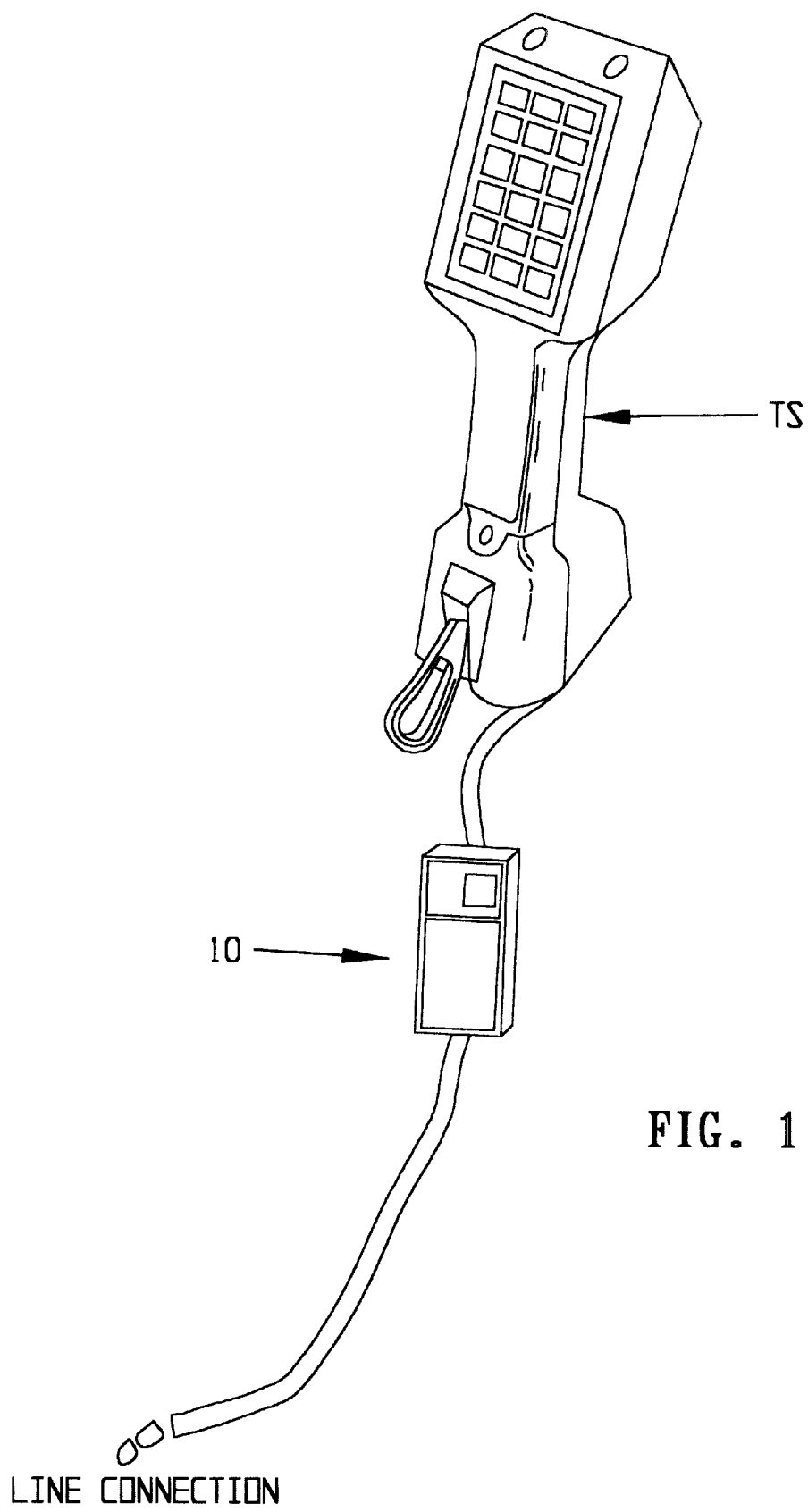
FIG. 1 is an illustration of the in-line telephony data protector of the present invention used as an add-on in conjunction with a test set.

Referring to FIGS. 1–13, an example of the preferred embodiment of the present invention is illustrated and generally indicated by the reference numeral 10. The data protector 10 may be incorporated into the design of a variety of telephony test equipment. As shown in FIG. 1, the in-line telephony data protector, or data protector 10, may be used in conjunction with a test set TS and generally forms a means for connecting and disconnecting the test set TS from the telecommunication line based upon the occurrence or absence of an event. The data protector 10 prevents the unintentional disruption of high speed data traffic on a telecommunication line by maintaining a disconnect between the test set TS and the telecommunication line until it can be verified that telecommunication signals are not present on the line. If data is not detected, the data protector 10 will connect the test set TS to the telecommunication line. If data is detected and a DC voltage is present on the line, the operator may consciously choose to override the disconnect and connect the test set to a line. As will be described in more detail below, this capability is desirable for DSL lines.

Figure 2:
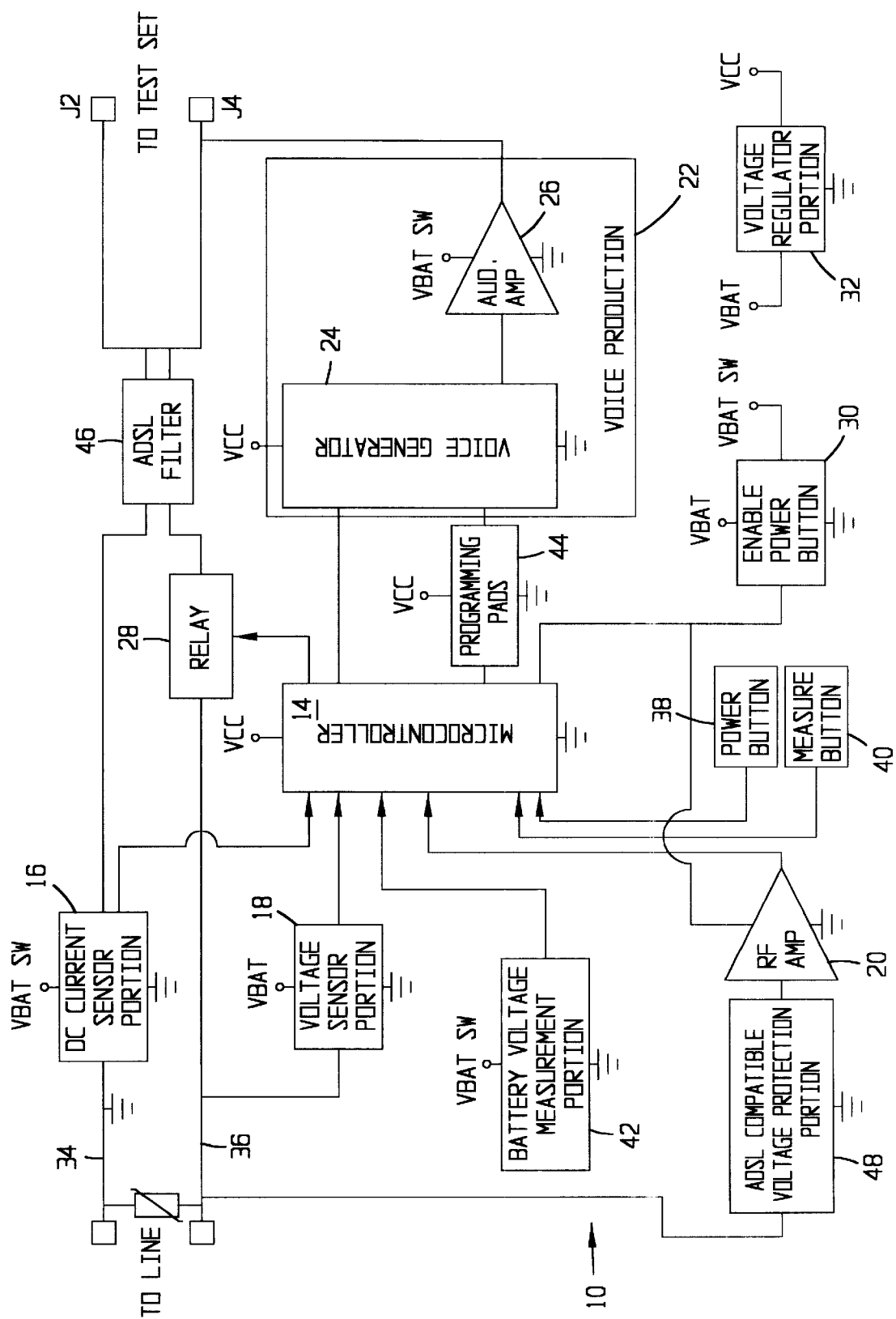
FIG. 2 is a block diagram of the electronic circuitry for the in-line data protector with voice announce.

Referring now to the block diagram of FIG. 2, the data protector 10 generally comprises electronic circuitry 12 contained within a housing. The electronic circuitry 12 includes a microcontroller 14, a DC Current Sensor Portion 16, a Voltage Sensor Portion 18, a wide band RF Amp Portion 20 for sensing data on a telecommunication line, a Voice Production Portion 22 including a voice generator 24 and audio amplifier 26 for providing voice announcement signals to the receiver of the test set TS, a Relay 28 for selectively connecting the test set TS to the telecommunication line, an Enable Power Portion 30 for switched, regulated power to other portions of the circuitry, and a Voltage Regulator Portion 32 for providing regulated power to other portions of the circuitry. The microcontroller 14 has software that performs a frequency counter function, a relay connect control function, an alert operator function, a DC current detect function, a voltage detect function, a fuse function for preventing the connection of a test set to the line if the voltage exceeds a normal POTS line (48 V), an automatic power up function, and an automatic hold power/power down function.

The cord, shown in FIG. 1, is connected to terminals J1 and J3 and the test set TS is connected to terminals J2 and J4. A conductor 34 extends between terminals J1 and J3 and another conductor 36 extends between terminals J2 and J4, and together provide means for connecting the test set TS to the Tip and Ring conductors of a circuit in a telecommunication line. The disconnect/connect function between the test set TS and the cord and ultimately the telecommunication line is performed by the relay 28, which is specially designed for telecom hookswitch applications, and is rated for the full range of DC and AC loads encountered in such situations. The relay 28 is normally open, thus normally disconnecting the test set TS from the telecommunication line, and is closed only by applying a control signal from the microcontroller 14. As will be described in more detail below, the microcontroller 14 only provides this control signal to close the relay 28 and connect the test set TS to the telecommunication line if (1) during its automatic monitoring of the line, no data signal is detected, or (2) the technician consciously overrides the disconnect when data is present on a DC powered line.

The powered data protector 10 continuously checks for data after a connection between the test set TS and line has been made and will disconnect the line when a signal is detected. The data protector 10 utilizes a wide band amplifier 20 in conjunction with the microcontroller 14c as a single or continuous band digital frequency detector. The microcontroller 14 counts the wave cycles of the signals to determine the frequency of the signal. The microcontroller 14 is operably connected to and controls the voice generator 24, which transmits an audio voice announce signal that is amplified through the audio amplifier 26 and received in the speaker in the ear piece of the test set TS, regardless of the spectrum of the data source. The microcontroller 14 causes the voice generator 24 to produce a specific voice announcement depending upon the detected condition of the line based on the outputs of the DC current sensor portion 16, the voltage sensor portion 18, and the amplifier 20.

The block diagram of FIG. 2 also shows that the electronic circuitry 10 includes a power button 38 for providing power to the data protector 10 when it is connected to a line without DC power, a measure button 40 for reporting the measured voltage and current in the telecommunication line, a battery voltage measurement portion 42 for detecting the remaining battery life, and programming pads 44 for programming the microcontroller 14 and the voice generator 24. Additionally, the block diagram shows a ADSL Filter 46 and an ADSL Compatible Voltage Protection Portion 48. As will be described in more detail below, elements 46 and 48 are beneficial in forming a ADSL compatible data protector.

Figure 3:
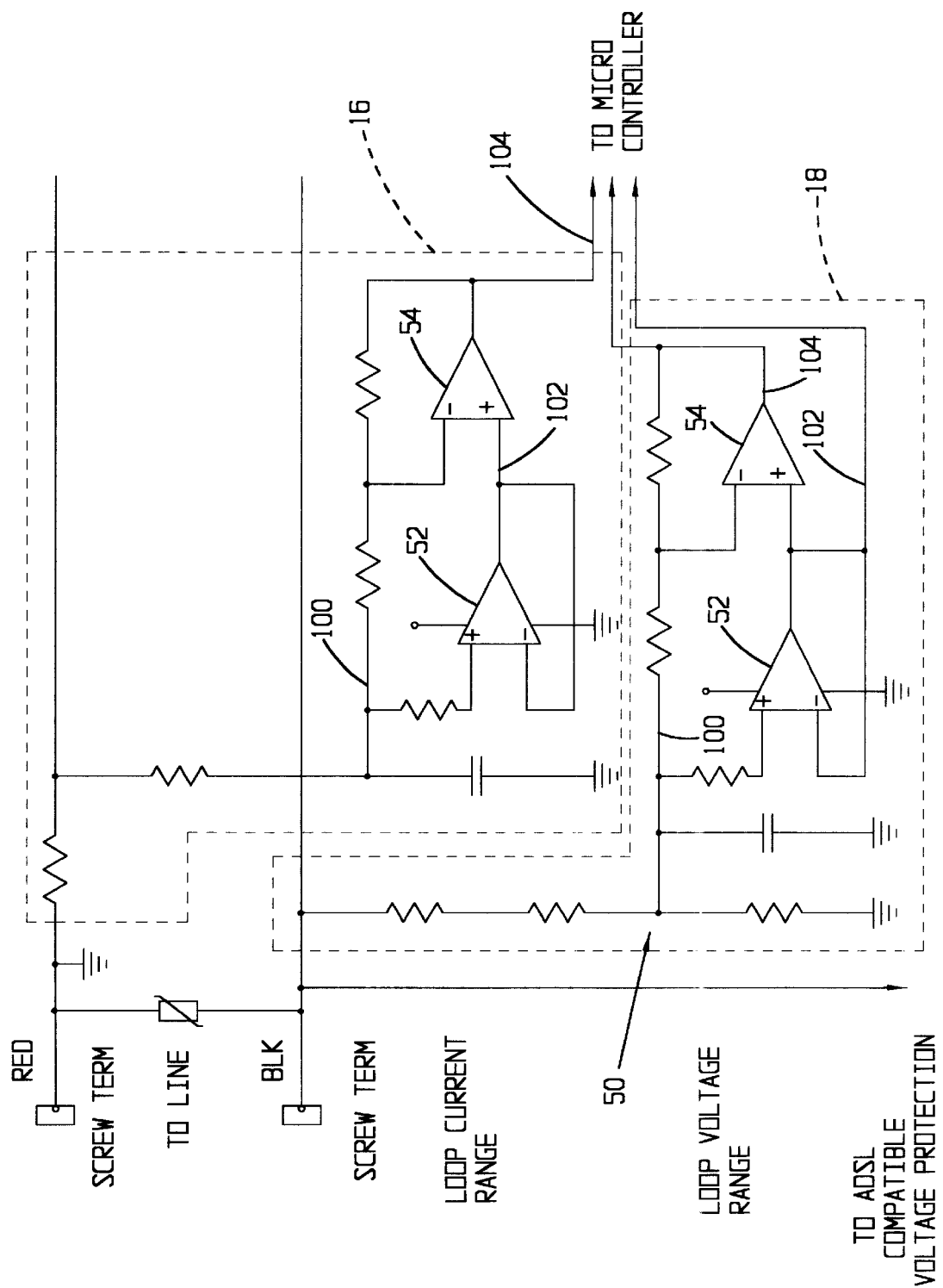
FIG. 3 is a schematic diagram for the DC Current Sensor Portion and Voltage Sensor Portion of the electronic circuitry of FIG. 2.
Figure 12A:
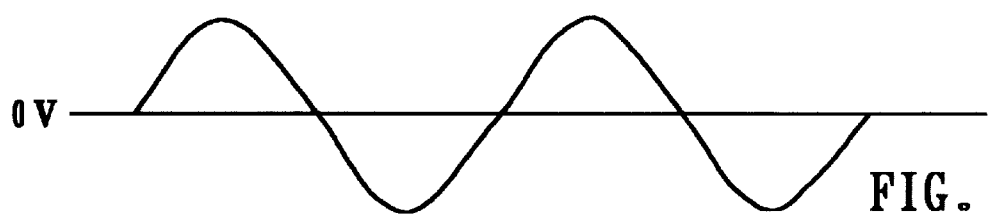
FIGS. 12a, 12b and 12c illustrate signal waveforms at the input, intermediate and output points of the precision full rectification circuitry used for the DC Current Sensor and Voltage Sensor portions.
Figure 12B:
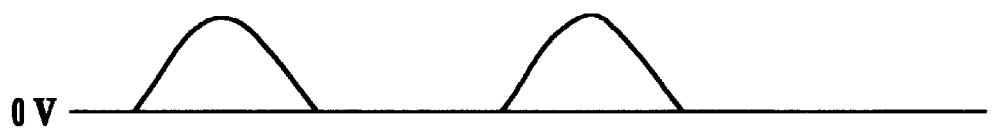
Figure 12C:
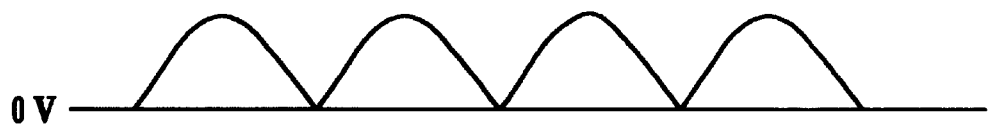

Referring now to FIGS. 2–8, the electronic circuitry 10 is described in more detail. The data protector 10 is powered by a 9-Volt battery, which is distributed to power the circuit 12 by the Enable Power Portion 30. The Enable Power Portion 30 is enabled if (1) DC voltage is present in the telecommunication line or (2) the power button 38 has been pressed. Referring to FIG. 3, operational amplifiers in the Voltage Sensor Portion 18 form a precision full rectification circuitry that provides a rectified signal to the microcontroller 14. The Voltage Sensor Portion generally comprises a resistor-based voltage divider 50 used to scale down the voltage to a usable level, a capacitor C33 to filter out AC signals so that only the average DC voltage is measured, an op amp connected as a voltage follower 52, and an op amp connected as an inverter 54. The follower 52 and inverter 54 are connected as an absolute value circuit to form a rectified signal. In the first mode, the microcontroller 14 will detect the presence of the DC power (either polarity) from the rectified signal, and will enable the Enable Power Portion 30 to distribute the switchable power VBAT_SW to the other portions of the circuit 12. FIG. 12a illustrates the signal at point 100 prior to the absolute value circuit, FIG. 12b illustrates the signal at point 102 between the follower 52 and the inverter 54, and FIG. 12c illustrates the fully rectified or absolute value signal at point 104 after the inverter 54.

By comparing the signal at point 102 with the signal at point 104, the microcontroller 14 is able to determine if the magnitude of the signal at point 104 is associated with a positive or negative voltage.

The DC Current Sensor Portion 16 measures line current. Line current is determined by measuring the voltage drop across a fixed resistor R44 through which the line current passes. Similar to the Voltage Sensor Portion 18, the DC Current Sensor Portion 16 includes a capacitor C32 to filter out AC signals, an op amp connected as a voltage follower 52, and an op amp connected as an inverter 54. The follower 52 and inverter 54 are connected as an absolute value circuitry to form a rectified signal.

Figure 13:
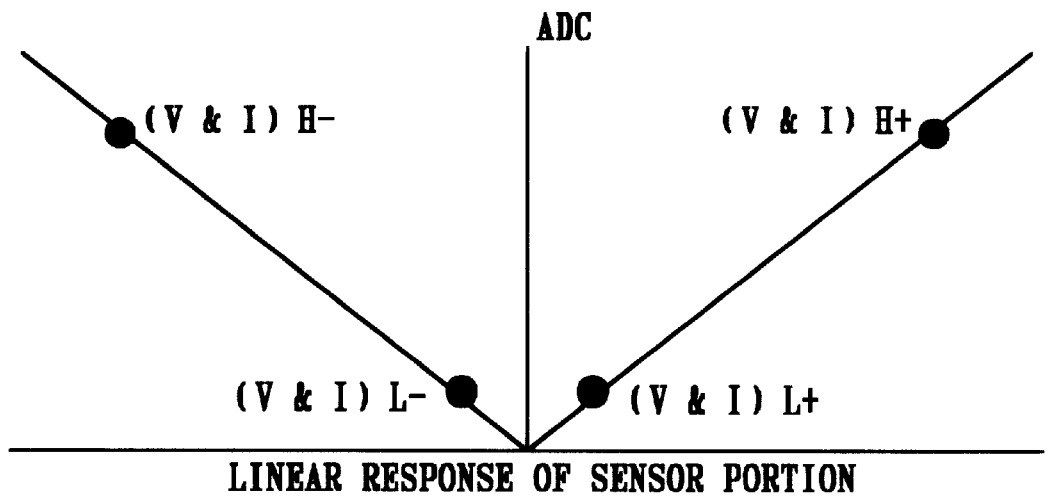
FIG. 13 illustrates the linearity of the DC Current Sensor and Voltage Sensor portions, which is used in a two-point software calibration of the sensors.

FIG. 13 illustrates that the transfer characteristics of the DC current sensor portion 16 and voltage sensor portion 18 are linear. As such, the positive and negative value for the voltage and current may be defined by a straight line having an equation y=mx=b. Therefore, these sensor portions 16 and 18 may be calibrated using a two point calibration method with software. Once calibrated, the microcontroller can apply the appropriate calibration calculations to convert the raw analog-digital converter (ADC) data into the appropriate measure.

The RF Amplifier detector portion 20 includes a high input impedance amplifier that extracts the signal from the telecommunication line and transmits it to an input port of the microcontroller 14. The microcontroller 14, also functioning as part of the detector portion, uses an event counter or frequency counter software routine to detect the presence of signals in the range of 5 kilohertz to 2 megahertz, i.e. above the voice band. If a signal of any frequency within that range is detected, the microcontroller outputs a control signal to the Voice Production Portion, which in turn produces the desired voice announcement. The voice announce signal is audible to the technician through the ear piece of the test set TS and indicates that a signal is present in the telecommunication line and that the test set TS will not be connected to the line. If no signal is detected, the microcontroller 14 outputs an enabling control signal on the CONNECT line to the relay 28 which closes the relay 28, connects terminal J3 to terminal J4, and permits normal test set (TS) usage. The second mode operates similarly to the first mode, except that the power switch is enabled by pressing the power button 38 rather than by the presence of a DC voltage. The microcontroller 14 senses that the power button 38 has been pressed, and sends out a "Hold Power" signal on the HOLD line to turn on the Enable Power Portion 30 of the circuitry 10 and distribute power for a predetermined period of time after the power button 38 has been pressed. After a predetermined period of time passes, the "Hold Power" signal is removed, the Enable Power Portion 30 turns off. In both the first and second modes, the data protector 10 automatically monitors the line for a wide frequency range of signals as long as the Enable Power Portion 30 is enabled, and automatically connects/disconnects the test set TS and the line depending on whether a signal is present on the line.

Figure 4:
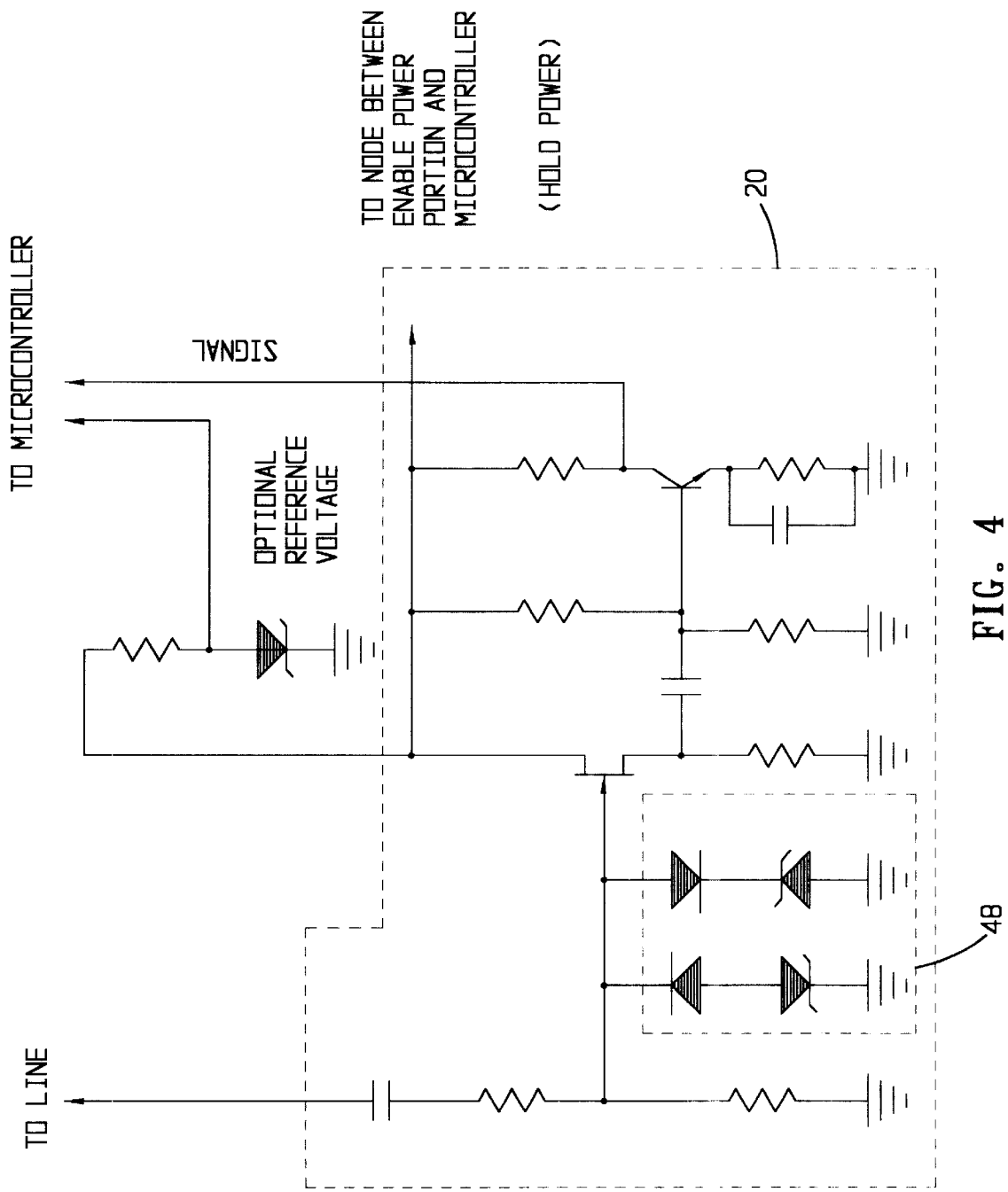
FIG. 4 is a schematic diagram for the wide band RF Amplifier and ADSL Compatible Voltage Protection Portion of the electronic circuitry of FIG. 2.

Referring still to the RF Amplifier 20 as shown in FIG. 4, an AC signal path is formed through the capacitor C1. The AC signal voltage is divided by resistors R2 and R3, and diodes CR5 and CR6 limit the AC signal voltage applied across transistor Q1.

Transistor Q1 and Q2 form an amplifier of sufficient gain such that a data signal in the range of 200 mV peak-to-peak to 6 V peak-to-peak can be detected. Capacitor C4 provides an AC signal path for the amplified signal to transistor Q2. Resistors R7 and R8 provide a bias voltage for turning on transistor Q2, and resistors R12 and R13 and capacitor C5 enable a digital signal to be presented to the input port of the microcontroller 14 on the SIGNAL line. A counter software routine in the microcontroller 14 counts the waves in the signal and determines whether a signal within the continuous frequency range is present.

Figure 10:
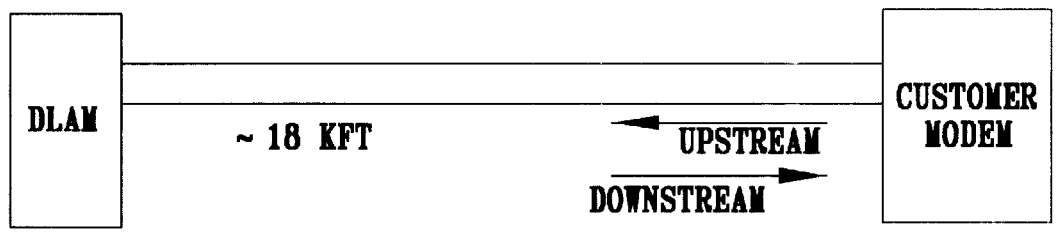
FIG. 10 is a schematic view of a Digital Subscriber Line extending from the Digital Subscriber Line Access Module and the Customer Modem.

FIG. 4 also shows the ADSL Compatible Voltage Protection Portion 48, which generally comprises diodes CR5 and CR6, and further incorporates Zener diodes CR10 and CR 11. The diodes CR10 and CR11 allow for approximately a 20 V signal swing, and maintain a relatively linear transfer characteristics for typical signals. Without these diodes, the input impedance into the RF Amplifier 20 changes considerably when the diodes CR5 and CR6 reach their bias voltage due to the 100 ohm driving impedance of the line and the relatively large resistor R3. This change in the input impedance compresses the peaks of the signal, and this non-linearity introduces harmonics with sufficient power to interfere with signals in another band. In FIG. 10, it is seen that a DSL line extends between a Digital Subscriber Line Access Module (DSLAM) to the Customer Modem. Upstream data flows from the modem to the DSLAM, and downstream data flows from the DSLAM to the modem. As shown in the illustrative PSD of FIG. 11, the upstream ADSL has considerably more power than the downstream ADSL because of the length of the line, typically around 18,000 feet. Therefore, the magnitude of the harmonics introduced based from a non-linear distortion in a POTS signal or upstream ADSL may be sufficient to detrimentally interfere with the downstream ADSL signals; and consequently, the minimizing any non-linear distortions using the ADSL Compatible Voltage Protection Portion minimizes the magnitude of any induced harmonics.

Figure 5:
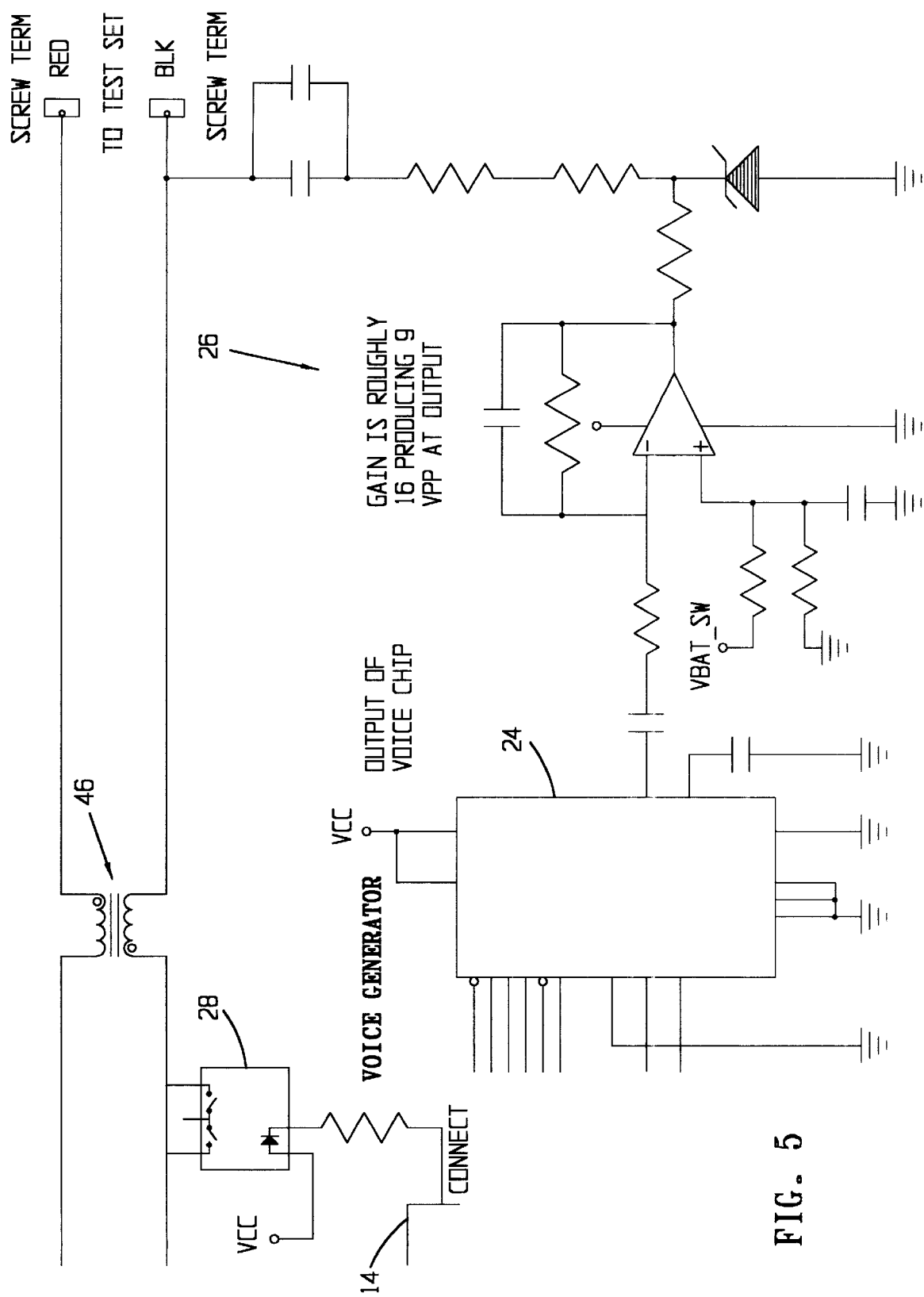
FIG. 5 is a schematic diagram for the Relay, the ADSL Filter, and the Voice Production Portion including the voice generator and audio amplifier of the electronic circuitry of FIG. 2.
Figure 11:
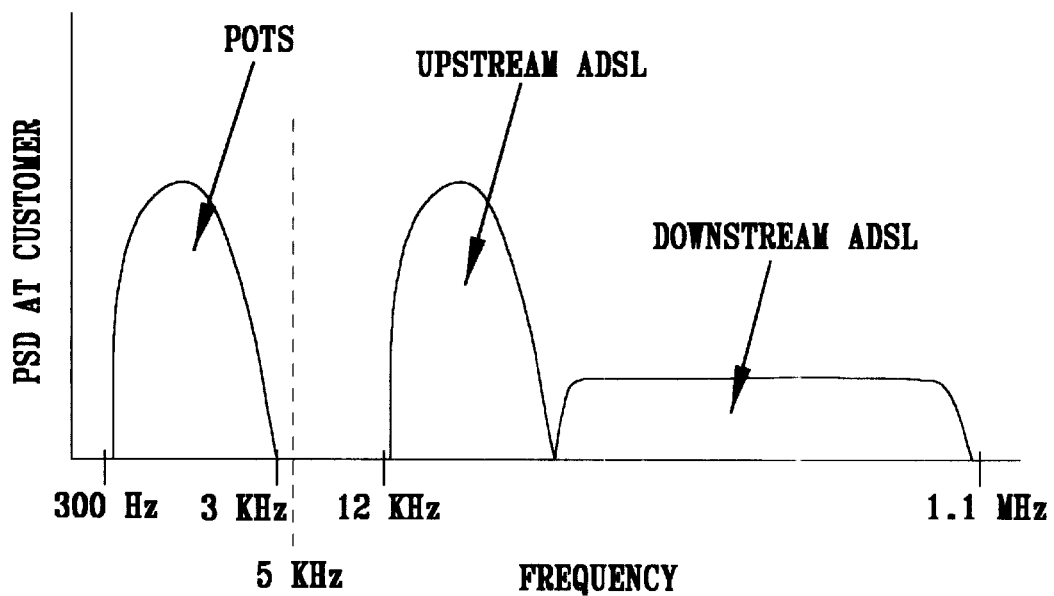
FIG. 11 is an illustration of the Power Spectral Density of the ADSL line near the customer.

Referring now to FIG. 5, the ADSL filter 46 is shown in more detail. The filter 46 is preferably a mutually aiding inductor in order to maintain a balanced line. The DSL filter 46 filters out frequencies above 5 kHz, which as illustrated in FIG. 11 will remove the ADSL signals and isolate the voice band POTS at the test set. Additionally, the relay 28 is shown in more detail. The relay is selectively closed by the microcontroller 14 using an active low/CONNECT signal. The microcontroller 14 sends a low signal on the active-low CONNECT line from if no signals are detected on the line, which causes current to flow through and close the relay. Since the relay is a normally-open relay, a connection between the test set TS and line only is made if the no signal is present on the line of if the technician consciously chooses to override the disconnect.

The voice generator 24 and the audio amplifier 26 also are illustrated in more detail in FIG. 5. The voice generator 24 may comprise an ISD4002 ChipCorder® product. According to its product literature, these products provide high-quality, 3-volt, single-chip record/playback solution for 2 to 4 minute messaging applications ideal for cellular phones and other portable products. The CMOS based device includes an on-chip oscillator, anti-aliasing filter, smoothing filter, AutoMute feature, audio amplifier, and high density, multilevel Flash storage array. The chip is designed to be used in a microprocessor or microcontroller-based system. Address and control are accomplished through a Serial Peripheral Interface (SPI) or Microwire Serial Interface to minimize pin count. Recordings are stored in on-chip non-volatile memory cells, providing zero-power message storage. This unique, single-chip solution is made possible through ISD's patented multilevel storage technology. Voice and audio signals are stored directly into solid-state memory in their natural form, providing high-quality voice reproduction.

By incorporating a voltage sensor portion 18 and a microcontroller 14, the data protector 10 of the present invention provides a "software fuse" that is able to protect the test set against the higher voltages associates with a line concentrator (such as Pair Gain) and T1 systems. A line concentrator system uses larger DC voltages to provide the necessary power to concentrate 24 or more phone lines into a single pair. However, unprotected test sets would be damaged if connected to this DC voltage. The data protector 10 will prevent a connection if it determines that the detected voltage is over the voltage associated with a POTS line.

Figure 9:
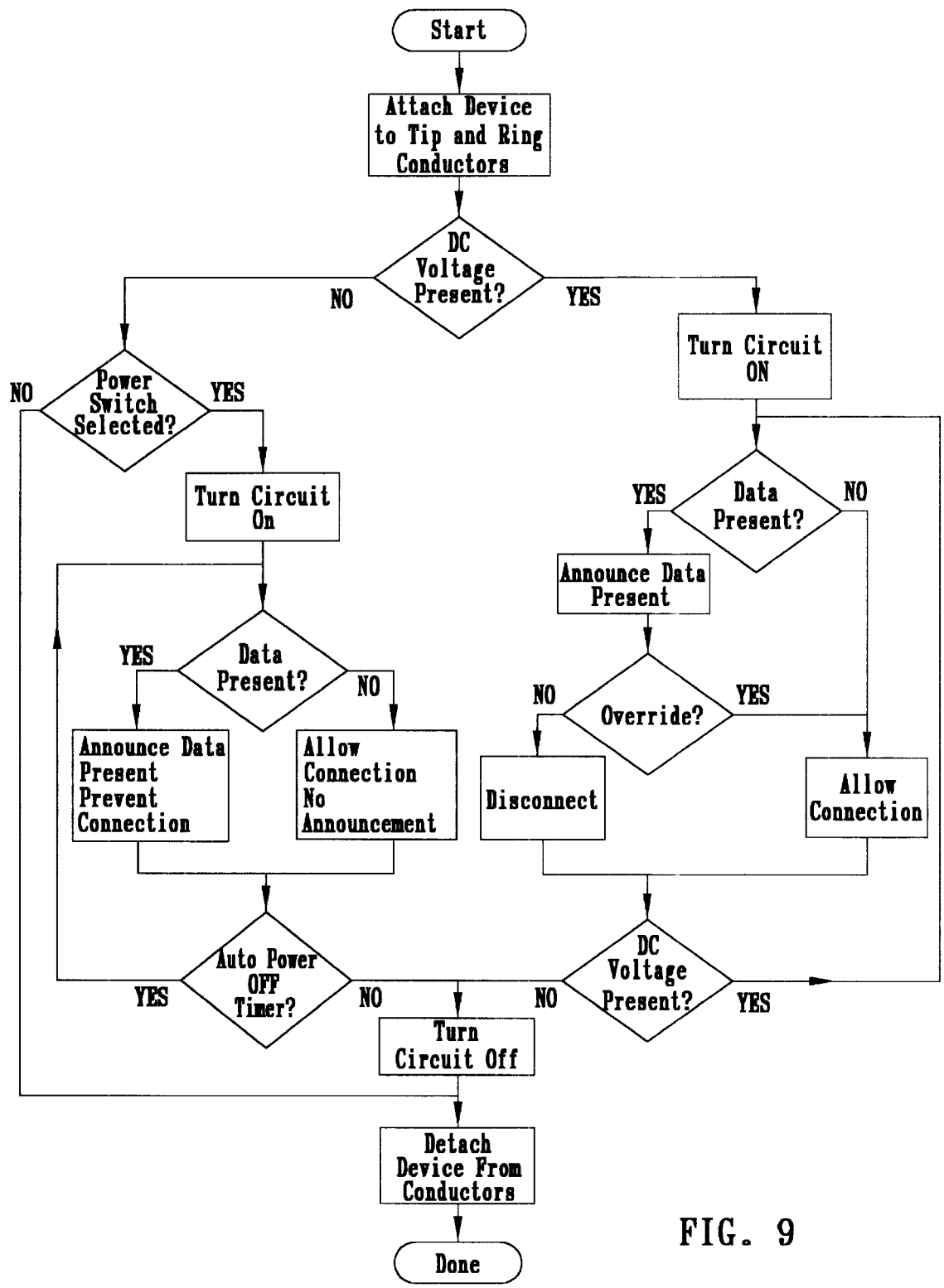
FIG. 9 is a flow chart of a method for preventing the unintentional disruption of high speed data traffic on a telecommunication line.

Referring now to FIG. 9, the flow chart generally indicates a method of using the data protector. First the technician attaches the data protector 10 between the Tip and Ring conductors. The data protector 10 then enters one of two states or modes of operation depending on whether DC voltage is present and whether the power button 38 has been pressed. If DC voltage is present and no data is found, a connection between the test set TS and line is made by closing the relay 28 allowing the technician to place the test set TS Off-Hook. If DC voltage is present and data is found, the connection remains open unless the technician consciously overrides the disconnect. This override feature is actuated by pressing and holding down the test button for 3 seconds, after which the data protector 10 connects the test set to the line as long as voltage remains present on the line. If the technician disconnects the test set from one line and moves it to another line, the data protector 10 will automatically open the relay and maintain a disconnect until no data is present or until the operator overrides the disconnect. In the second mode, DC voltage is not detected. A technician powers up the device and checks for the presence of data by pressing a power button (POWER switch S1). If no data is found, a connection between the test set TS and line is made by closing the relay 28 allowing an technician to place the test set Off-Hook. The device automatically powers down after a predetermined amount of time. In order to prevent an inadvertent connection to a data line in the second mode, the override function is not available.

The remainder of this specification describes the operation of the data protector from the viewpoint of a technician.

Normal Operation

When connecting to a regular POTS line, the data protector senses the presence of DC battery voltage on the line, turns itself on and connects to the line. Because of the automatic detection of the DC battery voltage on the line, no special actions are required to use the test set in its normal operation. When the connection to the line is broken, the data protector disconnects and turns itself off Normal operation with the line is completely automatic. An ascending power on beep and a descending power off beep are provided in the receiver the test set to keep the technician informed regarding the current line condition.

The signal on the line is amplified and presented to a frequency counter input of the microcontroller. If the frequency of the signal exceeds roughly 6 kHz, i.e. above the normal voice band, a data present condition is established that disconnects the test set from the line unless the override function is engaged.

Data Protection

If the data protector powers-up on a line and data is present on that line, the data protector automatically detects the data and prevents the disruption of the data by not allowing a connection to the line. In other words, the data protector does not connect to the line until it is determined that there is no data present. While data is present, a message is "announced" to the technician of the data-present condition.

Data Protection Override

On certain types of data lines such as DSL, the detection of data is imperative. However, it is still necessary to be able to connect to the line and draw dial tone within the voice band without harming the signals in the ADSL band. In this case, detection of the data and automatic disconnection of the test set from the line all work as usual. But by pressing and holding the "power" button for three seconds, the data protection mechanisms in the data protector are inhibited and a connection to the line is allowed. When this override condition is activated, the announcement of the presence of data in the test set is ceased to allow an uninterrupted conversation. The override feature is reset on power up.

A mutually aiding inductor functions as a ADSL filter 46 to pass the POTS signals to the test set while preventing the ADSL signals from being received at the test set. Additionally, a DSL coupled voltage protection portion 48 prevents the circuitry from compressing the signal and introducing harmonics that my interfere with the DSL band.

Additional Data Protection

The active voltage and current measurement capability of the data protector extends a new level of protection for the existing test sets against T1 span voltage and Pair Gain power supply voltages that are high enough to damage some test sets even in monitor mode. The data protector protects the test set by disconnecting the test set from the line under either over voltage or over current conditions. Once an over voltage or over current condition is encountered, the data protector will disconnect from the line and will continue to announce the particular overload condition until it is powered off and back on. As such, the data protector may be considered to have a software fuse

Monitoring Lines That do not Have DC Line Battery Voltage

The technician presses the "Power" button to activate the data protector and connect to the line. The power remains on for fifteen seconds and then the data protector powers off automatically. In this mode, data protection override is not available. This prevents the possibility of the technician disrupting a data line by turning on the data protector with the test set in its off-hook condition, going from pair to pair and connecting to a data bearing line. Because override is disabled in this mode, data will not be disrupted. An additional fifteen seconds will be added to the power on time for each time the power button is pressed. The power button may be pressed repeatedly to accumulate more power on time. The power on time may be increased up to fifteen minutes.

Measuring Line Condition: Voltage and Current Parameters

At any time while the data protector is active, the voltage and current of the line pair may be measured and reported by pressing the "Measure" button while the data protector is powered on. The parameters are spoken to the technician through the ear piece in the test set in the following format: "fifteen volts, twenty-seven milliamps", for example. The voltage measurement has a one-volt resolution and is capable of measuring, up to 100 VDC on the line with the line connected either forward or reversed. The current measurement will have a resolution of one milliampere and will be capable of measuring up to 100 milliamperes. If the voltage or current exceeds these values, then an overload condition will be announced. In situations where multiple readings are needed, the measure button is quickly pressed five times, for instance, five consecutive measurements will be made and reported.

The microcontroller has a built-in analog to digital converter, with an input range of 0.0 V to 3.3 V. The line voltage, which can be a couple hundred volts, is scaled down to a usable level through the use of a resistor-based voltage divider. Also, since the line voltage can be either positive or negative, a voltage-absolute-value circuitry is used so that either a positive or negative applied voltage will result in a positive voltage at the microcontroller. A capacitor is attached to the resistive divider to filter out AC signals so that only the average DC voltage is measured. Line current is determined by measuring the voltage drop across a fixed resistor through which the line current passes. A similar absolute value circuitry and AC rejection filter are used to measure line current as is used to measure line voltage. Calibration of the measurement features is performed in software as opposed to having physical adjustments on the board. This capability simplifies production. Because of the linearity of the sensor portions for both negative and positive values, the software can calibrate the sensors using a two-point selection process.

Battery Condition Test

The data protector operates on a standard nine-volt battery. Normal operation life is about 36 hours of actual operation. To determine the battery condition at any time, press and hold the measure button for three seconds. Once the current measurement of the line condition is completed, the data protector will announce the remaining power capacity of the battery. For example, the announcement may be "Battery at Seventy Five Percent". The battery should be changed when the battery reaches 5%. Although the data protector still functions with less than five percent remaining capacity, the accuracy of the voltage and current measurements will decrease.

Built in Toner

The data protector has a built in toner for placing a warble tone on a line pair for signal tracing. This feature is activated by pressing the measure button five times, and then pressing the power button. The data protector finishes the measurement report and then produces a warble tone that can be picked up with another test set or with an inductive probe. Using the precision audio circuitry, the warble tone has been engineered to produce the absolute least amount of crosstalk onto adjacent pairs.

Speaking

The heart of the voice function is a chip from ISD (Information Storage Devices). This chip is a highly refined, solid state, recording device that allows recording and playback up to two minutes. All words and phrases are stored in this chip and are accessed by sending specific starting address to the chip. A complete measurement process is made by measuring the voltage and current, applying the software calibration to these raw numbers, then organizing a sequence of words to be spoken. A typical concatenation of words is as follows "Twenty-One-Volts-(pause)-Thirty-Three-Milliamps". This concatenation is managed by process state machines in software. The output voltage of the voice chip is then amplified and presented to the test set side of the line. Appropriate transient suppression is used to filter the signal.

Although the invention has been described primarily in terms of embodiments that are retrofittable or attachable/detachable to a butt-in device, it is also within the purview of the invention that it could be unitarily incorporated within or dedicated to a test set device or other telephony test equipment.

The descriptions above and the accompanying drawings should be interpreted in the illustrative and not the limited sense. While the invention has been disclosed in connection with the preferred embodiment or embodiments thereof, it should be understood that there might be other embodiments that fall within the scope of the invention as defined by the following claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

What is claimed is:

1. An ADSL compatible data protector for telephony test equipment, comprising:
   (a) a relay for selectively connecting the telephony test equipment to a telecommunication line;
   (b) electronic circuitry, including:
      (i) a detector portion adapted for detecting signals within a continuous band of frequencies present on the telecommunication line; and
      (ii) a microcontroller having a frequency counter function for determining whether data is present on the telecommunication line, a relay connect control function for selectively controlling the relay to connect the telephony test equipment to the telecommunication line, and an alert operator function for producing a signal if the detected frequency is above a predetermined threshold; and
   (c) a ADSL filter connected between the telephony test equipment and the telecommunication line, the ADSL filter being adapted for preventing the telephony test equipment from detrimentally affecting DSL frequencies while enabling POTS frequencies to pass through to the telephony test equipment.

2. The data protector of claim 1, wherein the electronic circuitry further comprises a ADSL compatible voltage protection portion electrically connected between the telecommunication line and the detector portion, the ADSL compatible voltage protection portion being adapted for protecting against large voltage spikes and further being adapted for minimizing signal distortion that may introduce harmonic frequencies that may interfere with signals in higher frequency bands.

3. The data protector of claim 1, wherein the electronic circuitry further comprises a voice production portion operably connected to the microcontroller, the alert operator function producing an alert signal received by the voice production portion, in response to receiving the alert signal, the voice production portion being adapted for producing a corresponding voice announcement signal to a receiver in the telephony test equipment.

4. The data protector of claim 3, wherein the voice production portion includes a voice generator and an audio amplifier portion.

5. The data protector of claim 3, wherein the microcontroller further includes a warble toner function adapted for using the voice production portion to send a tracing signal engineered to minimize crosstalk into adjacent conductor pairs.

6. The data protector of claim 1, wherein the electronic circuitry further includes both a voltage sensor portion and a DC current sensor portion, each being adapted for sending a representative signal to the microcontroller, which in turn provides a voltage and current reading.

7. The data protector of claim 6, wherein both the voltage sensor portion and the DC current sensor portion have a linear response and are calibrated through software using two measured points for both negative and positive values.

8. The data protector of claim 7, wherein the voltage sensor portion and the DC current sensor portion each include a voltage absolute value portion adapted for providing a fully rectified signal to the microcontroller.

9. The data protector of claim 8, wherein the voltage sensor portion and the DC current sensor portion each include a voltage follower and a voltage inverter operably connected to form the fully rectified signal.

10. The data protector of claim 6, wherein the microcontroller performs a software fuse function for detecting large voltages on the telecommunication line and preventing connection of the telephony test equipment to the telecommunication line.

11. The data protector of claim 1, wherein the electronic circuitry provides the data protector with two modes of operation including:
   (i) a first mode wherein DC voltage is detected by the electronic circuitry causing the electronic circuitry to power up automatically and check for the presence of a signal and to connect the test set to the line if no signals are present on the line or if a technician consciously overrides the disconnect; and
   (ii) a second mode wherein the technician actuates a power button to power up the electronic circuitry and check for the presence of a signal for a predetermined period of time.

12. A ADSL-compatible data protector with line condition announce for telephony test equipment, comprising:
   (a) a relay for selectively connecting the telephony test equipment to a telecommunication line;
   (b) a ADSL filter connected between the telephony test equipment and the telecommunication line, the ADSL filter being adapted for preventing the telephony test equipment from detrimentally affecting ADSL frequencies while enabling POTS frequencies to pass through to the telephony test equipment; and
   (c) electronic circuitry, including:
      (i) a detector portion adapted for detecting signals within a continuous band of frequencies present on the telecommunication line;
      (ii) a microcontroller having a frequency counter function for determining whether data is present on the telecommunication line, a relay connect control function for selectively controlling the relay to connect the telephony test equipment to the telecommunication line, and an alert operator function for producing a signal if the detected frequency is above a predetermined threshold;

(iii) a ADSL compatible voltage protection portion electrically connected between the telecommunication line and the detector portion, the ADSL compatible voltage protection portion being adapted for protecting against large voltage spikes and further being adapted for minimizing signal distortion that may introduce harmonic frequencies that may interfere with signals in higher frequency bands; and (iv) a voice production portion operably connected to the microcontroller, the alert operator function producing an alert signal received by the voice production portion, in response to receiving the alert signal, the voice production portion being adapted for producing a corresponding voice announcement signal to a receiver in the telephony test equipment.

13. A ADSL-compatible data protector with line condition announce for telephony test equipment, comprising:

(a) a relay for selectively connecting the telephony test equipment to a telecommunication line;

(b) a ADSL filter connected between the telephony test equipment and the telecommunication line, the ADSL filter being adapted for preventing the telephony test equipment from detrimentally affecting ADSL frequencies while enabling POTS frequencies to pass through to the telephony test equipment; and (c) electronic circuitry, including:

(i) a detector portion adapted for detecting signals within a continuous band of frequencies present on the telecommunication line;

(ii) a voltage sensor portion and a DC current sensor portion, each being adapted for sending a representative signal to the microcontroller, which in turn provides a voltage and current reading, both the voltage sensor portion and the DC current sensor portion having a linear response and being calibrated through software using two measured points for both negative and positive values, the voltage sensor portion and the DC current sensor portion each including a voltage absolute value portion adapted for providing a fully rectified signal to the microcontroller;

(iii) a microcontroller having a frequency counter function for determining whether data is present on the telecommunication line, a relay connect control function for selectively controlling the relay to connect the telephony test equipment to the telecommunication line, an alert operator function for producing a signal if the detected frequency is above a predetermined threshold, and a software fuse function for detecting large voltages on the telecommunication line and preventing connection of the telephony test equipment to the telecommunication line;

(iv) a ADSL compatible voltage protection portion electrically connected between the telecommunication line and the detector portion, the ADSL compatible voltage protection portion being adapted for protecting against large voltage spikes and further being adapted for minimizing signal distortion that may introduce harmonic frequencies that may interfere with signals in higher frequency bands; and (v) a voice production portion operably connected to the microcontroller, the alert operator function producing an alert signal received by the voice production portion, in response to receiving the alert signal, the voice production portion being adapted for producing a corresponding voice announcement signal to a receiver in the telephony test equipment.

14. A method for preventing telephony test equipment from unintentionally disrupting signals on telecommunication lines, comprising the steps of:

(a) providing a relay between the telecommunication test equipment and the telecommunication line;

(b) providing electronic circuitry including a single band frequency counter;

(c) determining whether data signals are present on the telecommunication line using the single band frequency counter;

(d) in response to determining that data signals are not present on the line, closing the relay to connect the telecommunication test equipment to the telecommunication line;

(e) in response to determining that data signals are present on the line, providing an indication to the technician that data is present and preventing connection between the telecommunication test equipment and the telecommunication line; and (f) providing a ADSL filter between the telephony test equipment and the telecommunication line.

15. The method of claim 14, wherein the step of providing an indication to the technician includes the step of providing a voice announce signal in a receiver.

16. The method of claim 14, further comprising the steps of: prior to determining whether data signals are present on the telecommunication line, determining whether DC voltage is present on the telecommunication line; and in response to determining that DC Voltage is present, providing power to the electronic circuitry.

17. The method of claim 16, further comprising the step of: after providing an indication to the technician that data is present, determining whether an override command has been received; in response to determining that an override command has been received, closing the relay to connect the telecommunication test equipment to the telecommunication line.

18. The method of claim 14, further comprising the steps of: prior to determining whether data signals are present on the telecommunication line, determining whether a power switch has been selected; and in response to determining that the power button has been selected, providing power to the electronic circuitry for a predetermined period of time.

19. A method for preventing telephony test equipment from unintentionally disrupting signals on telecommunication lines, comprising the steps of:

(a) providing a relay between the telecommunication test equipment and the telecommunication line;

(b) providing a ADSL filter between the telephony test equipment and the telecommunication line;

(c) providing electronic circuitry including a single band frequency counter;

(d) determining whether DC voltage is present on the telecommunication line;

(e) in response to determining that DC voltage is present, providing power to the electronic circuitry;

(f) determining whether data signals are present on the telecommunication line using the single band frequency counter;

(g) in response to determining that data signals are not present on the line, closing the relay to connect the telecommunication test equipment to the telecommunication line;

(h) in response to determining that data signals are present on the line, providing an indication to the technician by providing a voice announce signal in a receiver that data is present and preventing connection between the telecommunication test equipment and the telecommunication line;

(i) determining whether an override command has been received; and (j) in response to determining that an override command has been received, closing the relay to connect the telecommunication test equipment to the telecommunication line.

* * * * *